H. O. PERRY.
Oscillating Steam-Engine.
No. 2,645. Reissued June 11, 1867.
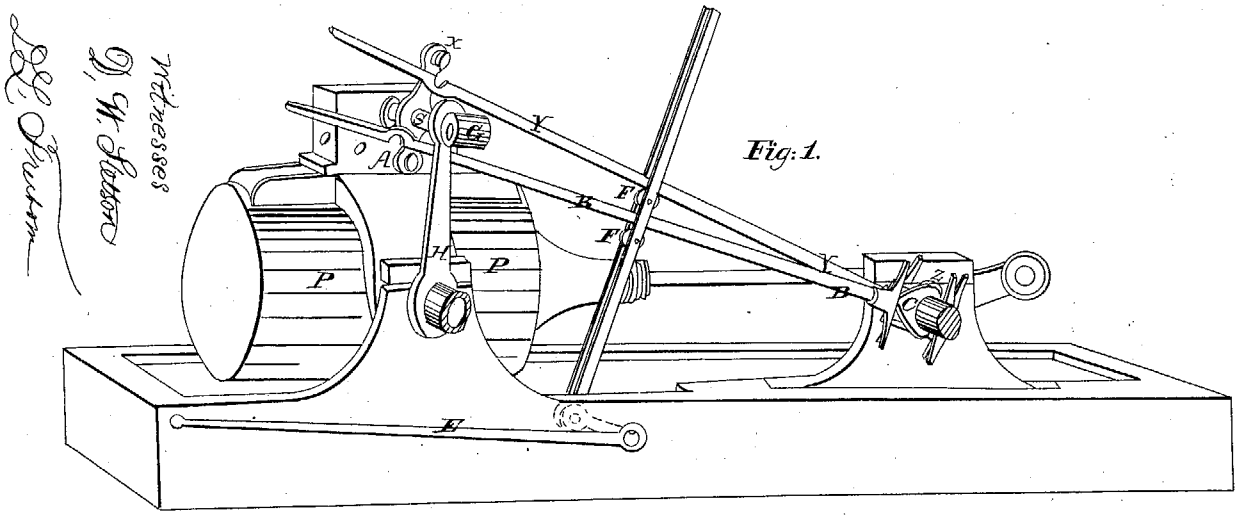
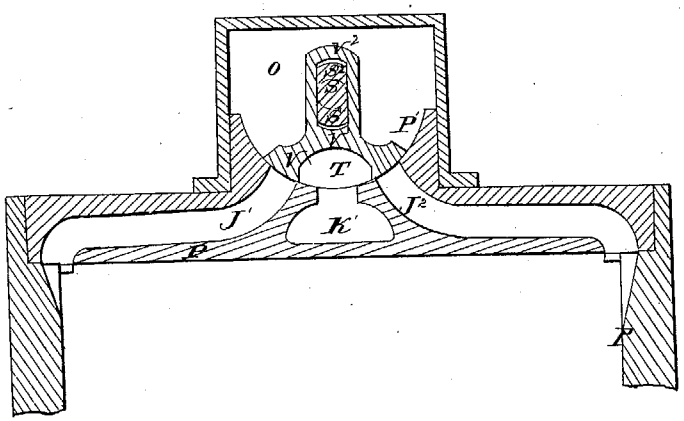
N. PETERS, PHOTO-LITHOGRAPHER, WASHINGTON, D. C.

United States Patent Office.

JOHN D. SHEPARD, OF BUFFALO, NEW YORK, ASSIGNEE OF HORATIO O. PERRY.

*Letters Patent No.* 14,516, *dated March* 25, 1856; *reissue No.* 2,645, *dated June* 11, 1867.

DIVISION A.

IMPROVEMENT IN VALVE-MOTION FOR STEAM ENGINES.

The Schedule referred to in these Letters Patent and making part of the same.

TO ALL WHOM IT MAY CONCERN:

Be it known that I, HORATIO O. PERRY, of the city of Buffalo, in the county of Erie, and State of New York, have invented a new and improved Valve and Valve-Motion for Steam Engines, the latter being designed only for oscillating steam engines; and I do hereby declare that the following is a full and exact description thereof, reference being had to the accompanying drawings, and to the letters of reference marked thereon.

The nature of my invention consists in dispensing with a great portion of the cumbrous and expensive mechanism generally employed, and obtaining an effect precisely similar to that of the ordinary slide-valve, by means of a rotary, or rather a vibrating valve operated in a new and simple manner, partly by the aid of eccentrics, and partly by the unavoidable motion of the cylinder. By properly proportioning the parts I obtain any desired amount of what is technically known as lead and lap, the facilities in these respects being precisely similar to those enjoyed in the use of the ordinary slide-valve.

To enable others skilled in the art to make and use my invention, I will proceed to describe its construction and operation.

I so construct my oscillating cylinder that the parts are led close together, as in locomotive cylinders, but I hollow out the "cylinder face," as represented in section in fig. 2, so that it will receive the valve V, and fit closely to its cylindric face.

Figure 1 is a general perspective view of the engine.

Figure 2 is a vertical section through the valve V, the valve-shaft S, the steam-chest O, and the upper portion of the main cylinder P—

Like parts being designated by the same letters in both drawings.

I work the valve V by partially rotating it upon an axis. The valve is not tightly fixed upon the valve-shaft S, but is free to move a little vertically in order to allow for wear, or for any slight inaccuracy in the adjustment. The valve-shaft S projects through a stuffing-box in the side of the steam-chest, and is provided with two arms A and X, only one of which is in use at any one time. The arms project in nearly opposite directions, and when desiring to turn the engine in one direction I connect the extremity of the lower arm A, by means of the rod B, to the eccentric or cam *c*. It will be understood that the oscillating motion of the cylinder P is partaken of by the steam-chest O, the valve-shaft S, and to a certain degree by the extremity of the arm A; so that without deriving any motion from the eccentric a sufficient amount of throw might be given to the valve, but no lead would be obtained. I introduce the eccentric *c*, either for the sole purpose of giving the desired lead to the valve, or of giving the lead and also increasing the throw. When desiring to work in the reverse direction I disconnect the rod B from the arm A, and connect the arm X, by means of the eccentric rod Y, to the eccentric Z. As the oscillating motion of the cylinder is more felt by this arm by reason of its greater distance from the axis of the trunnions, I make the arm X longer than the arm A; and as this increased length diminishes the effect of the eccentric, I give the eccentric Z more throw than *c*. The proportionate dimensions of all these parts in any case may be determined by any competent person, as also the precise device most suitable for connecting and disconnecting the eccentric rods. In the drawing, the eccentric rods are represented as hooking in opposite directions, and by elevating the lever E the pulleys or rollers F F are lifted, and both eccentric rods are raised until the upper one Y catches the pin X, and gives a backward motion to the engine. On the contrary, by depressing E, both rods are depressed until the rod B catches the arm A, and a forward motion is the result. To facilitate working by hand, I prolong the valve-shaft S, and provide its extremity with a socket, G, in which I insert a starting-bar at pleasure; and, to steady and support the valve-shaft S, I provide the arm H, fixed on the trunnion of the cylinder.

I do not claim the invention of rotating or partially rotating valves, loosely connected to shafts in the steam-chest; nor do I claim the opening and closing of ports by the oscillating motion of the cylinder; nor do I claim broadly the working of valves partly by the motion of the cylinder, and partly by the aid of eccentrics, irrespective of the peculiar form and arrangement described.

What I claim as my invention, and desire to secure by Letters Patent, in oscillating engines, is—

The valve-motion above described, as arranged in relation to and in connection with the loosely-attached, hollow-throated, and partially-rotating valve, substantially as described, and for the purposes herein set forth.

HORATIO O. PERRY.

Witnesses:

BENJ. H. WILLIAMS,

E. H. READ.